(12) United States Patent
Castulik et al.

(10) Patent No.: US 12,522,581 B2
(45) Date of Patent: Jan. 13, 2026

(54) PROCESS FOR PREPARATION OF AXITINIB

(71) Applicant: SYNTHON B.V., Nijmegen (NL)

(72) Inventors: Jakub Castulik, Blansko (CZ); Radomir Skoumal, Blansko (CZ)

(73) Assignee: Synthon B.V., Nijmegen (NL)

( * ) Notice: Subject to any disclaimer, the term of this patent is extended or adjusted under 35 U.S.C. 154(b) by 1126 days.

(21) Appl. No.: 17/604,322

(22) PCT Filed: Apr. 9, 2020

(86) PCT No.: PCT/EP2020/060193
§ 371 (c)(1),
(2) Date: Oct. 15, 2021

(87) PCT Pub. No.: WO2020/212253
PCT Pub. Date: Oct. 22, 2020

(65) Prior Publication Data
US 2022/0194921 A1    Jun. 23, 2022

(30) Foreign Application Priority Data

Apr. 18, 2019  (EP) ..................................... 19170258

(51) Int. Cl.
*C07D 401/06*  (2006.01)
*C07D 231/56*  (2006.01)

(52) U.S. Cl.
CPC ......... *C07D 401/06* (2013.01); *C07D 231/56* (2013.01)

(58) Field of Classification Search
CPC .................................................. C07D 401/06
See application file for complete search history.

(56) References Cited

FOREIGN PATENT DOCUMENTS

| WO | WO 2015/067224 A1 | 5/2005 |
| WO | WO 2006/048744 A1 | 5/2006 |

(Continued)

OTHER PUBLICATIONS

Singh, U.K.; Strieter, E.R.; Blackmond, D.G.; Buchwald, S.L. "Mechanistic Insights into the Pd(BINAP)-Catalyzed Amination of Aryl Bromides: Kinetic Studies under Synthetically Relevant Conditions" J. Am. Chem. Soc. 2002, 124, 14104-14114 (Year: 2002).*

(Continued)

*Primary Examiner* — Andrew D Kosar
*Assistant Examiner* — John D McAnany
(74) *Attorney, Agent, or Firm* — Buscher Patent PLLC

(57) ABSTRACT

In a process of making Axitinib, a palladium catalyst is added to a mixture of 2-vinylpyridine and the protected intermediate of formula (III) to form protected-Axitinib of formula (IV).

(Continued)

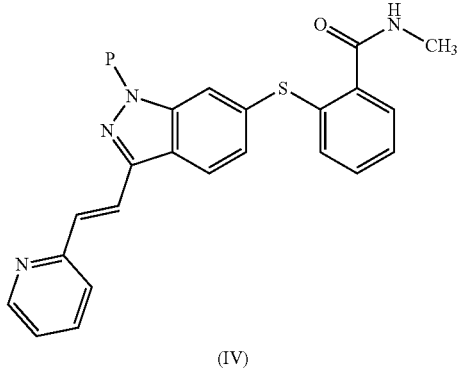

(IV)

In the formulas, P is a protective group and X is I, Cl, Br, or trifluoromethanesulfonate. The palladium catalyst is prepared separately, before being added to the reaction mixture, and is made from a mixture of a palladium source, a ligand, and a base in a suitable solvent. By adding the palladium catalyst to this protected intermediate, the process can use lower amounts of palladium and can have faster reaction times.

10 Claims, 1 Drawing Sheet

(56) References Cited

FOREIGN PATENT DOCUMENTS

| WO | WO 2006/048745 A1 | 5/2006 |
| WO | WO 2006/048751 A1 | 5/2006 |
| WO | WO 2016/108106 A1 | 7/2016 |

OTHER PUBLICATIONS

B. Chekal et al., "Development of an Efficient Pd-Catalyzed Coupling Process for Axitinib," *Organic Process Research & Development*, 2014, 18, pp. 266-274.

* cited by examiner

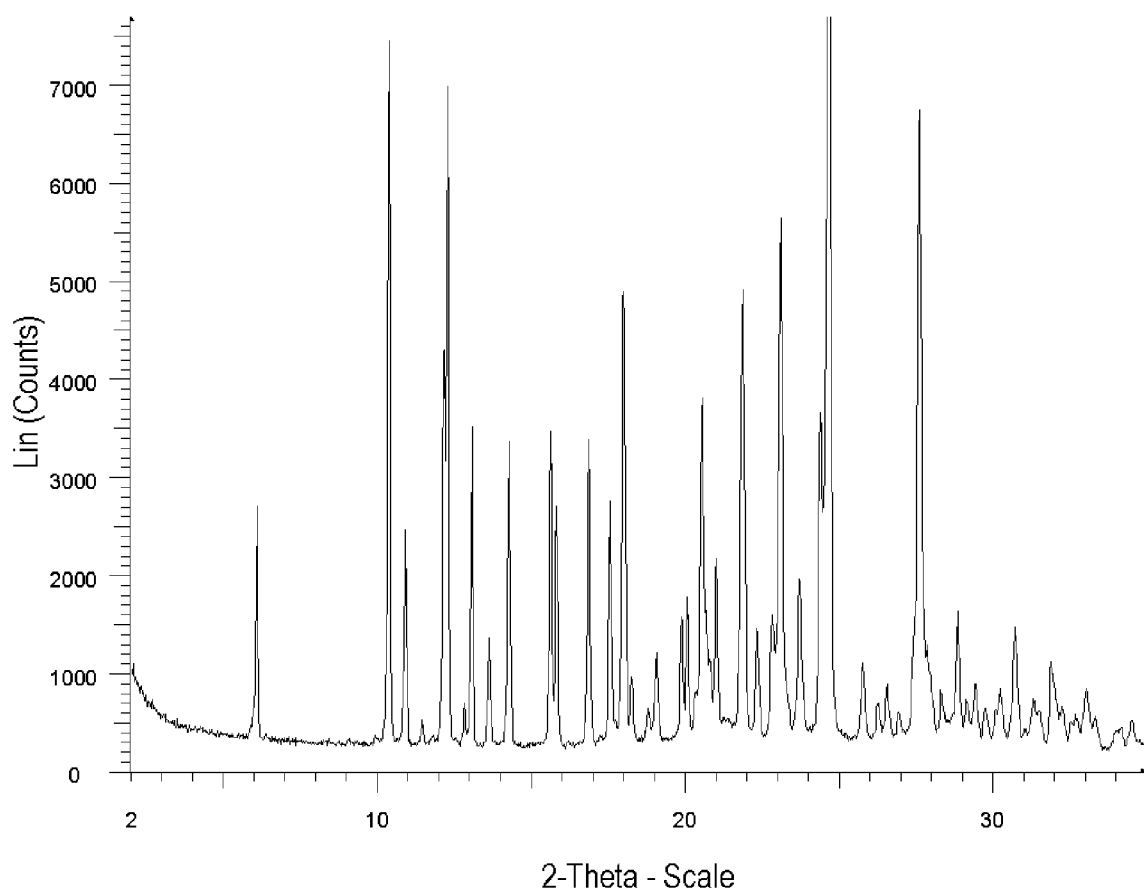

PROCESS FOR PREPARATION OF AXITINIB

BACKGROUND OF THE PRESENT INVENTION

The present invention relates to a process for preparation of the compound of formula (I), i.e. Axitinib or a salt or a solvate thereof.

Axitinib, N-methyl-2-({3-[(E)-2-pyridin-2-ylethenyl]-1H-indazol-6-yl}sulfanyl)benzamide of the formula (I):

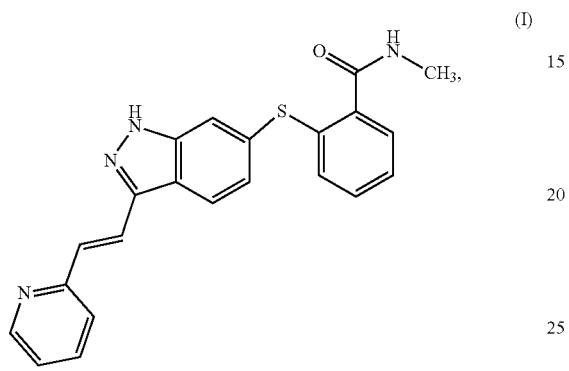

is an inhibitor of several tyrosine kinases involved in angiogenesis, particularly of VEGFR tyrosine kinases.

Axitinib has demonstrated clinical activity, both alone and in combination with other chemotherapeutics, in several types of tumors, including non-small cell lung cancer (NSCLC), metastatic renal cell carcinoma (mRCC), metastatic breast cancer, pancreatic cancer and thyroid cancer, and clinical studies are ongoing.

Axitinib has been disclosed in WO2001002369. Processes for making Axitinib have been disclosed as well (e.g. WO2001002369, WO2006048744, WO2006048745, WO2016108106, P. B. Chekal et al., Organic Process Research & Development, 2014, 18, 266-274). Prior art also discloses Axitinib salts (WO2006048751, WO2015067224).

The processes disclosed in WO2006048744 or in Organic Process Research & Development, 2014, 18, 266-274 comprise following reaction step:

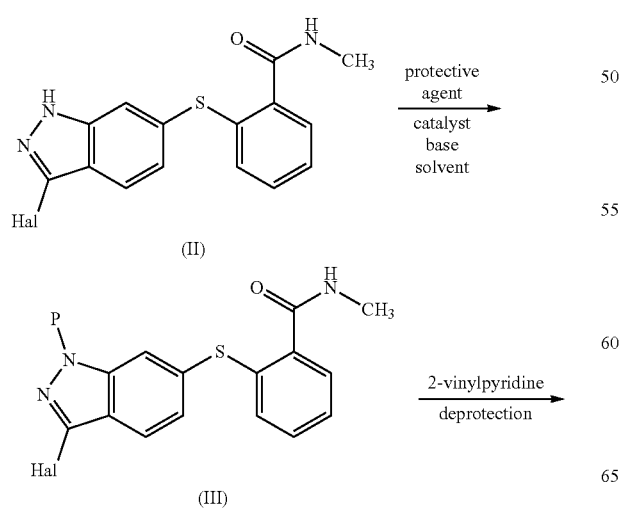

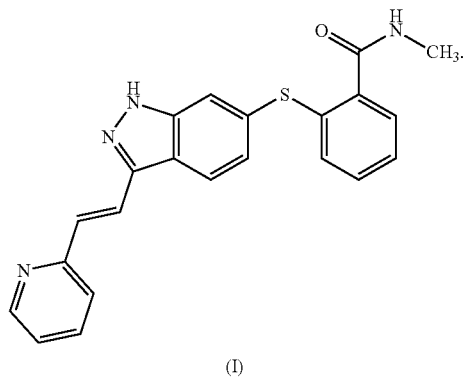

Hal means a halogenide, P is a protective group.

In the process described in WO2006048744 or in Organic Process Research & Development, 2014, 18, 266-274 the starting compound (II) is mixed with a catalyst, a base, a protective agent and a solvent. Once the protective reaction is completed, 2-vinylpyridine is charged and the reaction mixture is heated at the elevated temperature for 24 hours. After deprotection of obtained product the compound of formula (I) is provided. The drawback of described process is long reaction time and use of relatively high amount of Pd catalyst because removal of Pd from the final compound (I) is not trivial.

Hence, there is a need for an improved process for preparing Axitinib.

In particular, it would be desirable to have a process that uses lower amount of palladium catalyst and short reaction times, which is efficient in terms of yield and chemical purity, cost effective in terms of reagents and reaction conditions, and which is applicable on an industrial scale.

BRIEF DESCRIPTION OF THE PRESENT INVENTION

The presented invention relates to a process for the preparation of a compound of formula (I), i.e. Axitinib or a salt thereof:

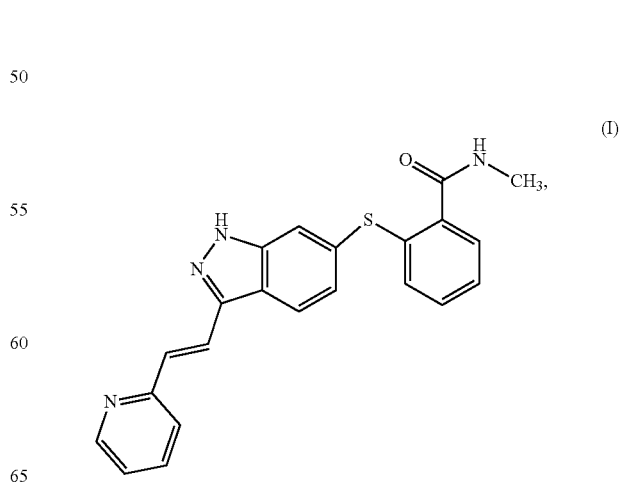

comprising reacting of compound of formula (III),

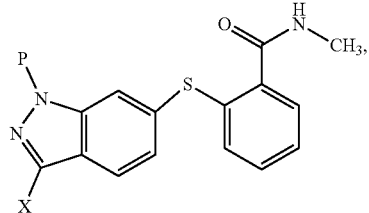
(III)

X is I or Cl or Br or trifluoromethanesulfonate, P is a protective group,
with 2-vinylpyridine in a presence of a palladium catalyst wherein the palladium catalyst is a mixture comprising a palladium source, a ligand and a base in a suitable solvent and wherein the palladium catalyst is prepared separately.

The presented invention also relates to a process for the preparation of a compound of formula (I) or a salt thereof:

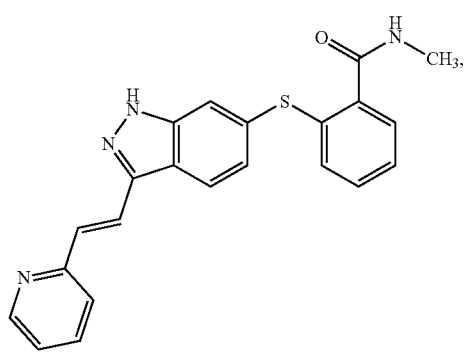
(I)

comprising:
a) Preparing a palladium catalyst wherein the palladium catalyst is a mixture comprising a palladium source, a ligand and a base in a suitable solvent;
b) Mixing compound of formula (III):

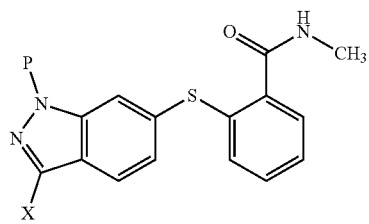
(III)

X is I or Cl or Br or trifluoromethanesulfonate, P is a protective group, with 2-vinylpyridine and a solvent;
c) Adding the palladium catalyst prepared in step a) to the mixture prepared in step b) to provide compound of formula (IV):

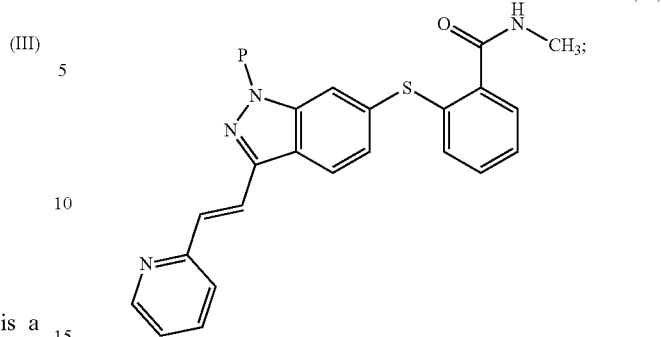
(IV)

d) Deprotecting compound of formula (IV) to provide compound of formula (I) or a salt thereof.

The presented invention also relates to a process for purification of compound of formula (I).

BRIEF DESCRIPTION OF THE DRAWINGS

FIG. 1: XRPD pattern of solid Form J of compound of formula (VIII)

DETAILED DESCRIPTION OF THE PRESENT INVENTION

The presented invention relates to process for the preparation of a compound of formula (I) or a salt thereof:

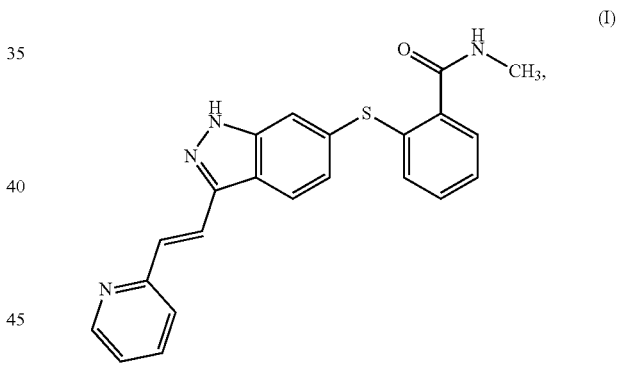
(I)

comprising reacting of compound of formula (III):

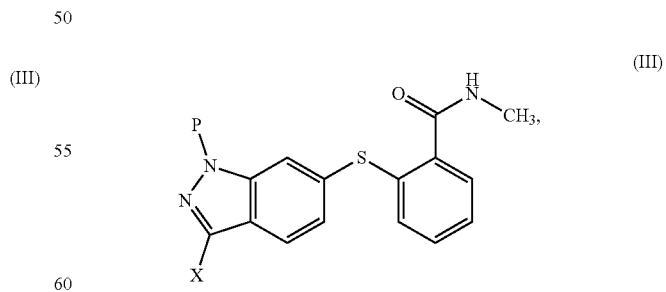
(III)

X is I or Cl or Br or trifluoromethanesulfonate, P is a protective group,
with 2-vinylpyridine in a presence of a palladium catalyst wherein the palladium catalyst is a mixture comprising a palladium source, a ligand and a base in a suitable solvent and wherein the palladium catalyst is prepared separately.

The process for preparation of compound of formula (I) disclosed in the prior art is depicted in following scheme:

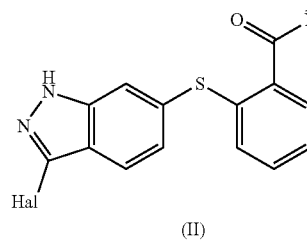

(II)

protective agent
catalyst
base
solvent

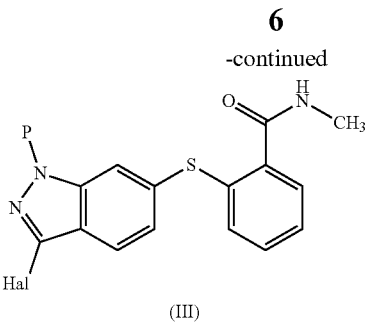

(III)

1. 2-vinylpyridine
catalyst
base
2. deprotection

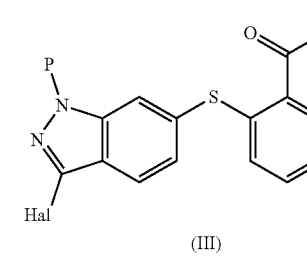

(III)

1. 2-vinylpyridine
2. deprotection

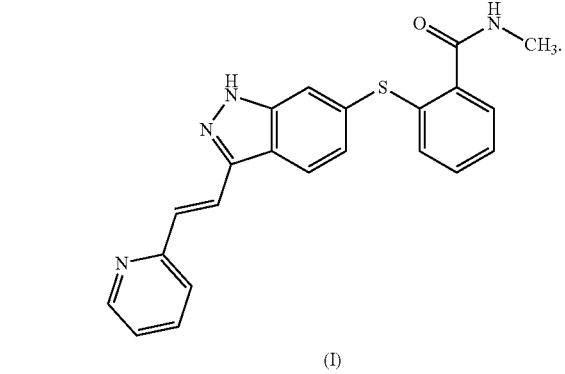

(I)

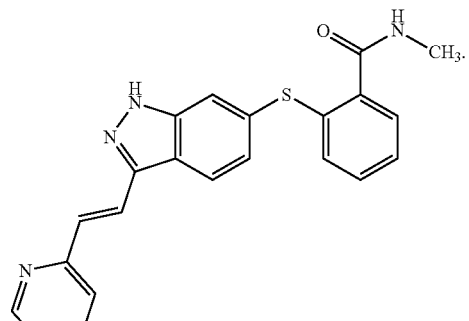

(I)

Hal means a halogenide, P is a protective group.

The starting compound (II) is mixed with a catalyst, a protective agent and a solvent. Once the protective reaction is completed, 2-vinylpyridine is charged and the reaction mixture is heated at the elevated temperature for 24 hours. After deprotection of obtained product the compound of formula (I) is provided.

Contrary to the processes described in the prior art, the process of the presented invention is depicted in following scheme:

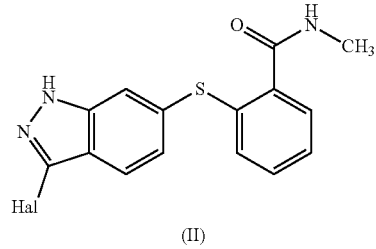

(II)

protective agent
solvent

The starting compound (II) is mixed with a protective agent and a solvent. Once the protective reaction is completed, 2-vinylpyridine and a catalyst are charged. The reaction mixture is heated at the elevated temperature for between 3 to 5 hours. The catalyst is prepared separately, that means it is not charged to the compound of formula (II) in the first step of the reaction sequence but to the compound of formula (III) in the second step of the reaction sequence. After deprotection of obtained product the compound of formula (I) is obtained. We have surprisingly found that using the presented process the reaction time to provide compound (I) is significantly decreased and the palladium source can be used in significantly lower amount.

The presented invention therefore also relates to a process for preparation of compound of formula (I) the process comprising:

a) Preparing a palladium catalyst wherein the palladium catalyst is a mixture comprising a palladium source, a ligand and a base in a suitable solvent;

b) Mixing compound of formula (III):

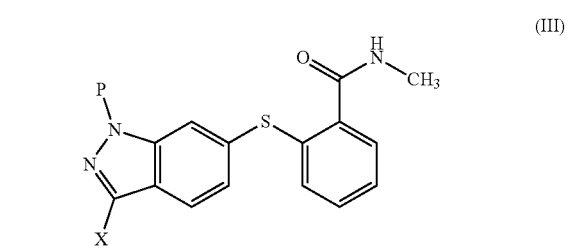

(III)

X is I or Cl or Br or trifluoromethasulfonate, P is a protective group, with 2-vinylpyridine and a solvent;

c) Adding the palladium catalyst prepared in step a) to the mixture prepared in step b) to provide compound of formula (IV):

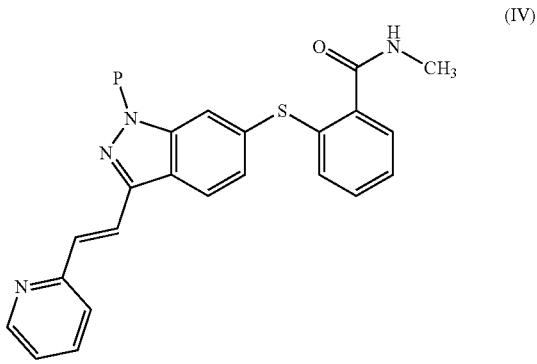

d) Deprotecting compound of formula (IV) to provide compound of formula (I) or a salt thereof.

X in compound of formula (III) is a halide selected from chlorine or bromine or iodine or trifluoromethasulfonate. X is preferably a halide selected from chlorine or bromine or iodine, more preferably it is iodine. P is a protective group for example acyl or acetyl or formyl or sulfonyl or carbamate or tetrahydropyrane or tert-butoxycarbonyl or a protective group disclosed in Protective groups in organic synthesis, Theodora W. Greene and Petr G. M. Wuts, 3rd Ed., John Wiley & Sons Inc. P is preferably acetyl.

The palladium catalyst in step a) is prepared by mixing the palladium source with the ligand in the solvent under a protective atmosphere, for example under argon or nitrogen. The mixture is stirred for 5 to 20 minutes and the base is added in the mixture. The mixture can be heated to a temperature between 25° C. and the reflux temperature of the solvent, preferably to 50-75° C.

The palladium source can be selected from tetrakis(triphenylphosphine)palladium or palladium chloride or palladium acetate, preferably it is or palladium acetate. The palladium source can be used in a range between 1 to 3% (mol %, based on compound (III)), preferably it is used in a range 1 to 2.5% (mol %, based on compound (III)), more preferably in a range 1 to 2% (mol %, based on compound (III)). The concentration of the palladium source in the solvent can be between 0.001 g/ml and 0.009 g/ml, preferably it is between 0.002 g/ml and 0.006 g/ml, more preferably it is between 0.003 g/ml and 0.005 g/ml.

The ligand can be selected from triphenylphosphine or phosphinooxazolines or 4,5-Bis(diphenylphosphino)-9,9-dimethylxanthene, preferably it is 4,5-Bis(diphenylphosphino)-9,9-dimethylxanthene. The molar ratio ligand:palladium source can be between 1:1 and 1.5:1, preferably it is 1:1.

The base can selected from a carbonate (such as potassium carbonate or sodium carbonate) or a hydrogencarbonate (such as potassium hydrogencarbonate or sodium hydrogencarbonate) or an acetate (such as sodium acetate) or an amine (such as trimethylamine or triethylamine or morpholine or N,N-diisopropylethylamine or N,N-dicyclohexylmethylamine). The base is preferably N,N-dicyclohexylmethylamine. The concentration of the base in the solvent can be between 0.01 and 0.15 g/ml, preferably between 0.03 and 0.1 g/ml, more preferably between 0.04 and 0.08 g/ml. The molar ratio base:compound of formula (III) can be between 1:1 and 10:1, preferably it is between 1.5:1 and 5:1, more preferably between 2:1 and 4:1. The solvent can be selected from 1-methyl-2-pyrrolidone or tetrahydrofurane or N,N-dimethylformamide or dimethylacetamide or dimethylsulfoxide or toluene or acetonitrile or dioxane or water or a mixture thereof, preferably it is 1-methyl-2-pyrrolidone.

In the step b) a mixture comprising compound of formula (III), 2-vinylpyridine and a solvent is prepared under a protective atmosphere, for example under argon or nitrogen.

The solvent can be selected from an aprotic polar solvent, for example 1-methyl-2-pyrrolidone or tetrahydrofurane or N,N-dimethylformamide or dimethylacetamide or dimethylsulfoxide or toluene or acetonitrile or dioxane or water or a mixture thereof, preferably 1-methyl-2-pyrrolidone is used.

The concentration of compound (III) in the solvent can be between 0.15 and 1 g/ml, preferably it is between 0.2 and 0.7 g/ml, more preferably between 0.25 and 0.5 g/ml.

The molar ratio of compound (III) and the 2-vinylpyridine can be between 1:3 and 1:10, preferably it is between 1:4 and 1:8, more preferably between 1:5 and 1:7.

The base can selected from a carbonate (such as potassium carbonate or sodium carbonate) or a hydrogencarbonate (such as potassium hydrogencarbonate or sodium hydrogencarbonate) or an acetate (such as sodium acetate) or an amine (such as trimethylamine or triethylamine or morpholine or N,N-diisopropylethylamine or N,N-dicyclohexylmethylamine) or 1,2-diaminopropane. The base is preferably N,N-dicyclohexylmethylamine.

The mixture of step a) is added to the mixture of step b) and the resulting mixture is heated to a temperature between 80° C. and the reflux temperature of used solvent, preferably at a temperature between 110° C. and 130° C. for 1 to 10 hours, preferably for 2 to 5 hours. The reaction progress can be monitored by a suitable technique, for example HPLC or GC. After the reaction is finished, the mixture can be diluted with tetrahydrofurane. The weight ratio between the reaction solvent (i.e. a sum of the amount of solvent used in step a) and the amount of solvent used in step b)) and tetrahydrofurane can be between 1:1 and 3:1, preferably it is between 1.3:1 and 2:1. The mixture can then be optionally filtrated over for example celite, preferably at an elevated temperature for example between 50° C. and 70° C.

In the step d) the protected compound of formula (IV),

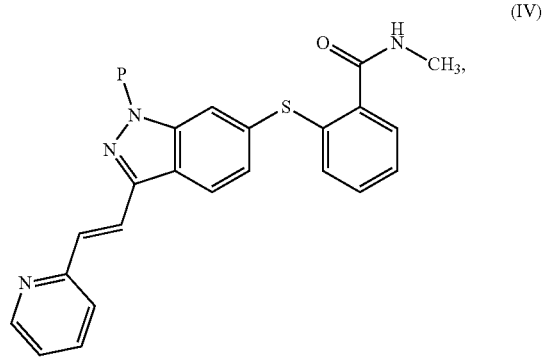

is deprotected by a suitable deprotecting agent, for example using 1,2-diaminopropane, using a catalytic hydrogenation (using $H_2$ in a presence of a catalyst, such as Pd or Pt or Ni) or using acidic (for example hydrochloric acid or trifluoroacetic acid) or base (for example piperidine or ammonia) deprotection. The deprotecting agent can be added directly to the reaction mixture prepared in step c). In a preferred case, where the protective group is acetyl, 1,2-diaminopropane is advantageously used as a deprotective agent. The deprotecting of compound of formula (IV) is preferably performed at a temperature between 15° C. and 30° C., more preferably at a temperature between 20 and 25° C. The molar ratio between 1,2-diaminopropane and the compound of formula (IV) can be between 1.5:1 and 7:1, preferably it is between 2:1 and 4:1. The reaction progress can be monitored by a suitable technique, for example HPLC or GC.

Prepared compound of formula (I) can be optionally isolated from the reaction mixture, for example by addition of an antisolvent. As antisolvent water or a mixture thereof with water soluble organic solvent, for example tetrahydrofurane can be used. The volume ratio between water and the water miscible organic solvent can be between 2:1 and 10:1, preferably it is between 4:1 and 7:1. The volume ratio of added water or a mixture of water with water miscible organic solvent and the total amount of solvents in the reaction mixture of step d) can be between 4:1 and 15:1, preferably it is between 5:1 and 8:1. The antisolvent can be added to the mixture at an elevated temperature, for example at a temperature between 40° C. and 65° C., preferably at a temperature between 50° C. and 55° C. and the mixture can be stirred at this temperature for between 10 and 60 minutes. The obtained solid compound of formula (I) can be isolated by any suitable isolation technique, for example by filtration.

The compound of formula (III) can be prepared by protecting compound of formula (II):

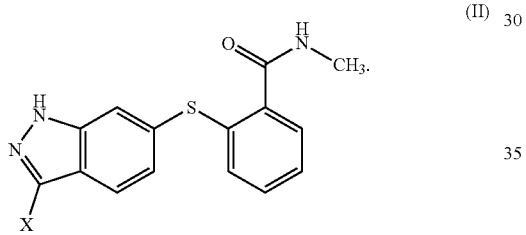

(II)

X is a halide or trifluoromethasulfonate by a suitable protecting agent. The protecting reaction is performed in a suitable solvent preferably under a protective atmosphere, for example under argon or nitrogen. In a preferred embodiment, wherein P is acetyl group, acetic anhydride is used as a protecting agent.

The suitable solvent can be for example in 1-methyl-2-pyrrolidone or dimethylsulfoxide or toluene or acetonitrile or dioxane or toluene or water or a mixture thereof, preferably in 1-methyl-2-pyrrolidone is used.

The concentration of compound of formula (II) in the solvent can be between 0.2 and 0.8 g/ml, preferably it is between 0.3 and 0.5 g/ml.

The molar ratio between the compound of formula (II) and the protecting agent can be between 1:1.5 and 1:5, preferably it is between 1:1.9 and 1:3.

The base can selected from a carbonate (such as potassium carbonate or sodium carbonate) or a hydrogencarbonate (such as potassium hydrogencarbonate or sodium hydrogencarbonate) or an acetate (such as sodium acetate) or an amine (such as trimethylamine or triethylamine or morpholine or N,N-diisopropylethylamine or N,N-dicyclohexylmethylamine). The base is preferably N,N-dicyclohexylmethylamine. The molar ratio between the compound (II) and the base can be between 1:1.8 and 1:5, preferably it is between 1:2 and 1:3. The concentration of the base in the used solvent can be between 0.2 and 0.8 g/ml, preferably it is between 0.3 and 0.5 g/ml.

The protecting reaction is performed preferably at an elevated temperature between 80° C. and the reflux temperature of the used solvent, more preferably at a temperature between 100° C. and 130° C. for 10 to 180 minutes. The reaction progress can be monitored by a suitable technique, for example HPLC or GC.

The compound of formula (II) can be prepared by a process comprising:
  a) Reacting compound of formula (V) with compound of formula (VI) in the presence of copper or palladium source to provide compound of formula (VII):

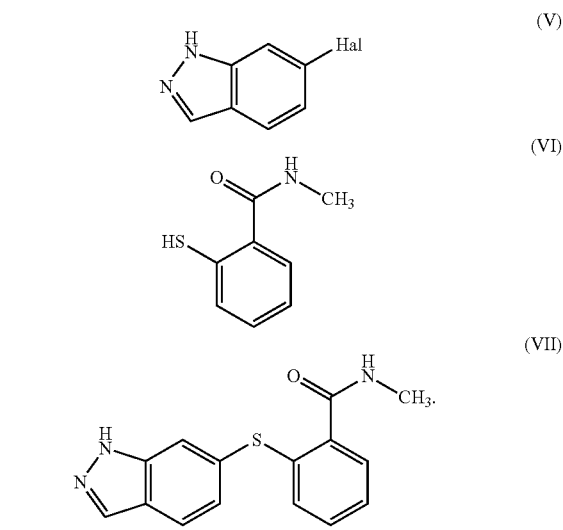

Hal means Cl or Br or I
  b) Halogenating or triflating compound of formula (VII) to obtain compound of formula (II).

Compounds of formula (V) and (VI) are commercially available.

The reaction is performed a suitable solvent for example 1-methyl-2-pyrrolidone or dimethylsulfoxide or toluene or acetonitrile or dioxane or water or a mixture thereof, preferably in 1-methyl-2-pyrrolidone is used. The reaction can be performed under a protective atmosphere, for example under argon or nitrogen atmosphere. The concentration of compound (V) in the solvent can be between 0.4 and 2 g/ml, preferably between 0.5 and 1.3 g/ml.

The concentration of compound (VI) in the solvent can be between 0.4 and 2 g/ml, preferably it is between 0.5 and 1.3 g/ml.

The molar ration between compounds (V) and (VI) can be between 1:1 and 1:2, preferably it is between 1:1 and 1:2.

The copper or palladium source can be selected from Copper(II) Acetate or CuI or CuBr or $(CuOTf)_2C_6H_6$ or CuCl or CuTC or $Cu(MCN)_4PF_6$ or Copper(I) Acetate or Bis(1,3-propanediamine) Copper(II) Dichloride or Bis(8-quinolinolato)copper(II) or Bis(2,4-pentanedionato)copper (II) or Copper(I) Cyanide or Copper(I) 2-Thiophenecarboxylate or Copper(II) Tetrafluoroborate or Di-µ-hydroxo-bis[(N,N,N',N'-tetramethylethylenediamine)copper(II)] Chloride or Dichloro(1,10-phenanthroline)copper(II) or Copper(II) Trifluoromethanesulfonate or Copper(I) Trifluoromethanesulfonate Benzene Complex or Tetrakis(acetonitrile)copper(I) Hexafluorophosphate or Tetrakis(acetonitrile)copper(I) Tetrafluoroborate. The copper or palladium source is preferably Copper (II) Acetate or Copper (II) Acetate hydrate. The amount of the copper or palladium source can be between 3 and 10% (wt %, based on compound (V)), preferably it is between 2 and 5% (wt %, based on compound (V)).

The reaction is performed in a presence of a base. The base can selected from a carbonate (such as potassium carbonate or sodium carbonate) or a hydrogencarbonate (such as potassium hydrogencarbonate or sodium hydrogencarbonate) or an acetate (such as sodium acetate) or an amine (such as trimethylamine or triethylamine or morpholine or N,N-diisopropylethylamine or N,N-dicyclohexylmethylamine). The base is preferably a carbonate such as potassium carbonate or sodium carbonate. The molar ratio between the base and the compound of formula (V) can be between 2:1 and 5:1, preferably it is between 2.5:1 and 4:1.

The reaction is performed at a temperature between 80° C. and the reflux temperature of the used solvent, preferably at a temperature between 90 and 130° C. for 60 to 240 minutes, preferably for between 80 and 120 minutes. The reaction progress can be monitored by a suitable technique, for example HPLC or GC.

Compound of formula (VII) is transformed in step b) into compound of formula (II) using a halogenating agent or a triflating agent in a solvent. As a halogenating agent for example N-bromosuccinimide or bromine or HBr or a bromide (such as $NH_4Br$, NaBr, KBr, CuBr, $ZnBr_2$) or $I_2$ or an iodide (such as $NH_4I$, NaI, KI, CuI, $ZnI_2$) or ICl or N-Iodosuccinimide or trimethyl silyl iodide or N-Chlorosuccinimide or Trichloroisocyanuric acid can be used. The halogenating reaction can be performed in a presence of another reagent (activator) such as $CF_3COOH$ or $AgNTf_2$ or $H_2SO_4$ or $H_2O_2$ or $BF_3.Et_2O$ or $NaIO_4$ or DMSO. The triflating agent can be trifluoromethanesulfonic acid. The halogenating or triflating agent is preferably $I_2$. The suitable solvent can be selected from 1-methyl-2-pyrrolidone or acetonitrile or water or acetic acid or nitromethane or halogenated alkanes (such as dichloromethane, chloroform) or an acetate (such as methylacetate, ethyl acetate, isopropyl acetate, iso-butyl acetate) or tetrahydrofurane or 2-methyltetrahydrofurane or an alcohol (such as methanol or ethanol or butanol or s-butanol or tert-butanol or isopropanol or tert-amyl alcohol or amyl alcohol) or 1,4-dioxane. The solvent is preferably 1-methyl-2-pyrrolidone.

The concentration of the halogenating agent or the triflating agent in the solvent can be between 0.5 and 10 g/ml, preferably it is between 1.5 and 7 g/ml, more preferably it is between 2 and 5 g/ml. The molar ratio between the compound of formula (VII) and the halogenating agent or the triflating agent and can be between 1:1.2 and 1:5, preferably it is between 1.5 and 2.5. The reaction is performed under a protective atmosphere, for example under argon or nitrogen atmosphere at a temperature between 90° C. and 130° C., preferably at 110° C. and 120° C. for between 1 and 5 hours, preferably for between 1 and 3 hours. The reaction progress can be monitored by a suitable technique, for example HPLC or GC. In a preferred embodiment where the halogenating agent is $I_2$, the reaction mixture is worked out using following procedure. After the reaction is finished, to the mixture a water miscible organic solvent, for example acetonitrile or acetone or an alcohol (such as methanol or ethanol or propanol or butanol or tert-butanol) or tetrahydrofurane or 2-methyltetrahydrofurane, preferably acetonitrile, is added. The weight ratio between the added water miscible organic solvent and the solvent used is halogenating/triflating step b) can be between 1:1 and 3:1, preferably it is between 1.1:1 and 1.6:1. The mixture is cooled to a temperature between 70° C. and 80° C. To the mixture a solution of L-ascorbic acid in water is added. The concentration of the L-ascorbic acid in water can be between 0.15 and 0.3 g/ml, preferably between 0.2 and 0.25 g/ml. The solution of L-ascorbic acid is added slowly, preferably in the course of between 30 and 240 minutes, preferably between 120 and 180 minutes.

The mixture is stirred at the same temperature for between 10 and 60 minutes.

The mixture is cooled to between −10° C. and 10° C., preferably to between −5° C. and 5° C. and stirred at this temperature for between 20 to 60 minutes to precipitate the compound of formula (II). The precipitated compound of formula (II) can be isolated by any suitable technique, for example by filtration.

We have surprisingly found that the compound of formula (II), or where X means I, i.e. compound of formula (IIa):

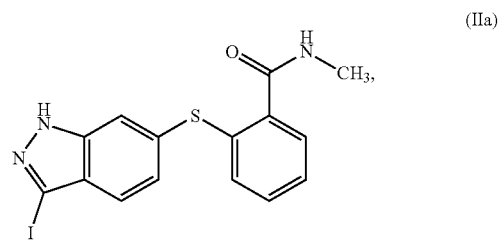 [SMILES: CNC(=O)c1ccccc1Sc1ccc2c(I)n[nH]c2c1]

(IIa)

can be purified by a process comprising:

a) Mixing compound of formula (II) or formula (IIa) with 1-methyl-2-pyrrolidone;

b) Heating the mixture at a temperature between 70° C. and 120° C. to dissolve compound of formula (II) or formula (IIa);

c) Isolating compound of formula (II) or formula (IIa) by cooling the solution.

In the step a) the concentration of compound (II) or formula (IIa) in the mixture can be between 0.4 g/ml and 1.5 g/ml, preferably it is between 0.6 g/ml and 0.9 g/ml.

The mixture in step b) is heated to a temperature between 70° C. and 120° C., preferably to a temperature between 100° C. and 110° C. The mixture is stirred at this temperature for between 30 and 120 minutes, preferably between 45 and 80 minutes. The mixture is then in step c) cooled to a temperature between −10° C. and 20° C., preferably between 0° C. and 10° C. and stirred at this temperature for 30 min and 180 minutes, preferably for between 60 minutes and 120 minutes. The precipitated compound of formula (II) or formula (IIa) can be isolated by any suitable technique, for example by filtration.

The compound of formula (II) or formula (IIa) purified by given procedure shows good crystallinity and purity and provides a possibility for further improving of the chemical purity of compound of formula (I).

We have also surprisingly found that the compound of formula (I) can be purified by a process comprising:

a) Reacting compound of formula (I) with hydrogen chloride in a solvent to form compound of formula (VIII);

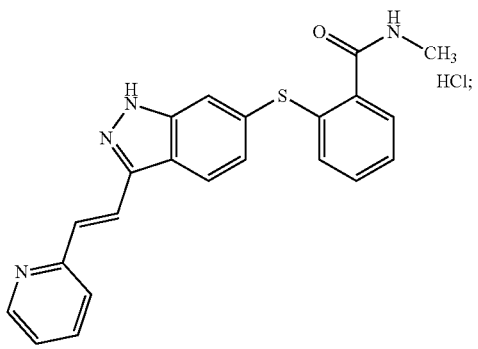

(VII)

b) Isolating a solid form of compound of formula (VIII) by adding an antisolvent;
c) Contacting compound of formula (VIII) with a base in a solvent to obtain compound of formula (I).

The solid form, Form J, of compound of formula (VIII) can be characterized by XRPD pattern comprising the peaks at about 6.1°, 10.4°, 12.2°, 13.10, 14.3°, 16.9°, 18.0°, 23.10, 24.7° and 27.7° 2θ (±0.2 degrees 2θ), when measured with CuKα1 radiation. The solid form can be further characterized by XRPD pattern comprising the peaks at about 6.1°, 10.4°, 10.7°, 12.2°, 13.1°, 14.3°, 15.5°, 15.9°, 16.9°, 18.0°, 20.6°, 22.7°, 23.1°, 24.7°, 25.9°, 26.3°, 27.7° and 32.0° 2θ (±0.2 degrees 2θ), when measured with CuKα1 radiation. The solid form can be also characterized by XRPD pattern comprising the peaks disclosed in the following table:

| Angle (2-Theta °) | Intensity (%) |
|---|---|
| 6.1 | 17.1 |
| 6.4 | 2.4 |
| 10.0 | 2.1 |
| 10.4 | 47.3 |
| 10.9 | 15.6 |
| 11.5 | 3.3 |
| 11.8 | 2.3 |
| 12.2 | 30.9 |
| 12.8 | 4.4 |
| 13.1 | 22.2 |
| 13.6 | 8.6 |
| 14.3 | 21.3 |
| 15.6 | 21.9 |
| 15.9 | 17.1 |
| 16.9 | 21.4 |
| 17.6 | 17.5 |
| 18.0 | 31.0 |
| 18.3 | 6.0 |
| 18.8 | 4.0 |
| 19.1 | 7.7 |
| 19.9 | 9.9 |
| 20.6 | 24.1 |
| 21.0 | 13.7 |
| 21.9 | 31.2 |
| 22.4 | 9.2 |
| 22.9 | 10.1 |
| 23.1 | 35.8 |
| 23.7 | 12.4 |
| 24.4 | 23.2 |
| 24.7 | 100.0 |
| 25.8 | 7.0 |
| 26.3 | 4.4 |
| 26.6 | 5.6 |
| 27.0 | 3.8 |
| 27.7 | 42.8 |
| 28.0 | 6.7 |
| 28.4 | 5.2 |
| 28.9 | 10.3 |
| 29.2 | 4.6 |
| 29.5 | 5.6 |
| 29.8 | 4.0 |
| 30.3 | 5.3 |
| 30.8 | 9.3 |
| 31.4 | 4.6 |
| 32.0 | 6.6 |
| 32.3 | 4.2 |
| 32.7 | 3.6 |
| 33.1 | 5.3 |
| 33.4 | 3.5 |
| 34.2 | 2.8 |
| 34.6 | 3.2 |

The solid form of compound of formula (VIII) can be also characterized by XRPD pattern depicted in FIG. 1.

The solvent in step a. can be selected from tetrahydrofuran or 1-methyl-2-pyrrolidone or a mixture thereof. Preferably a mixture of tetrahydrofuran or 1-methyl-2-pyrrolidone is used. The weight ratio tetrahydrofuran:1-methyl-2-pyrrolidone can be between 1:1.4 and 1:2.5, preferably it is between 1:1.6 and 1:2.1, more preferably it is 1:1.9. The concentration of compound of formula (I) in the solvent or in the solvent mixture can be between 0.2 and 1 g/ml, preferably it is between 0.3 and 0.6 g/ml. The hydrogen chloride can be added in gaseous form or as a solution for example in N,N-dimethylformamide or 1-methyl-2-pyrrolidone or an alcohol (such as methanol or ethanol or propanol or isopropanol) or tetrahydrofurane or 2-methyltetrahydrofurane or acetonitrile or acetone or dioxan, preferably solution in N,N-dimethylformamide is used. The concentration of hydrogen chloride in the solvent can be for example between 5% and 40% (wt), preferably it is between 10% and 20% (wt). The molar ratio between the hydrogen chloride and the compound of formula (I) can be between 1:1 and 10:1, preferably it is between 1:1 and 2:1. The compound of formula (I) is dissolved in the solvent or the solvent mixture. The mixture is heated to an elevated temperature, for example between 50° C. a the reflux temperature of the used solvent or solvent mixture, preferably to a temperature between 60° C. and 85° C. The mixture is stirred at this temperature for between 10 and 120 minutes, preferably for between 15 and 45 minutes. To the mixture the antisolvent is added. The antisolvent can be selected from an alcohol (such as methanol or ethanol or propanol or 2-propanol or isopropanol or butanol) or water, preferably an alcohol, more preferably methanol is used. The weight ratio antisolvent:the solvent or the solvent mixture can be between 1.5:1 and 10:1, preferably it is between 2:1 and 5:1, more preferably between 2:1 and 4:1. The antisolvent is added in the course of between 60 and 240 minutes, preferably between 120 and 180 minutes. The mixture is then stirred for between 10 and 120 minutes, preferably for between 15 and 45 minutes. The mixture is cooled to a temperature between −20° C. and 10° C., preferably to a temperature between −5° C. and 5° C. and stirred at this temperature for between 60 and 240 minutes, preferably for between 120 and 180 minutes to isolate solid compound of formula (VIII). The compound of formula (VIII) can be isolated by any suitable technique, for example using filtration. The compound of formula (VIII) can be further contacting with a base in a solvent to obtain compound of formula (I). The solvent can be selected from tetrahydrofuran or 1-methyl-2-pyrrolidone or a mixture thereof. Preferably a mixture of tetrahydrofuran and 1-methyl-2-pyrrolidone is used. The weight ratio tetrahydrofuran:1-methyl-2-pyrrolidone can be between 1:1.5 and 1:5, preferably it is between 1:2 and 1:4. The concentration of compound of formula (VIII) in the solvent or the solvent mixture can be between 0.1 g/ml and 1 g/ml, preferably it is between 0.15 and 0.3 g/ml. The base can be selected from a carbonate (such as potassium carbonate or sodium carbonate) or a hydrogencarbonate (such as potassium hydrogencarbonate or sodium hydrogencarbonate) or an acetate (such as sodium acetate) or an amine (such as trimethylamine or triethylamine or morpholine or N,N-diisopropylethyl amine or N,N-dicyclohexylmethylamine) or 1,2-diaminopropane, preferably it is 1,2-diaminopropane. The molar ratio between the compound of formula (VIII) and the base can be between 1:3 and 1:10, preferably it is between 1:4 and 1:6. The mixture can be heated to a temperature between 40° C. and the reflux temperature of used solvent or a mixture thereof, preferably to a temperature between 50° C. and 70° C. and stirred at this temperature for 10 and 120 minutes, preferably form between 15 and 45 minutes. To the mixture an antisolvent is added. The antisolvent can be selected form an alcohol (such as methanol or ethanol or propanol or 2-propanol) or water, preferably methanol is used. The weight ratio the solvent or the solvent mixture:antisolvent can be between 1.5:1 and 10:1, preferably it is between 2:1 and 5:1, more preferably between 2:1 and 4:1. The antisolvent is added in the course of between 60 and 240 minutes, preferably between 120 and 180 minutes. The mixture is the stirred for between 10 and 120 minutes, preferably for between 15 and 45 minutes. The mixture is then cooled to a temperature between −20° C. and 10° C., preferably to a temperature between −5° C. and 5° C. and stirred at this temperature for between 60 and 240 minutes, preferably for between 120 and 180 minutes to isolate the compound of formula (I). The compound of formula (I) can be isolated by any suitable technique, for example using filtration. The isolated compound of formula (I) can be dried. The compound of formula (I) is obtained in excellent yield and purity (almost 100%, HPLC ES (external standard)).

The compound of formula (I) can be further transformed into solid Form IV that is disclosed in WO2006048751 application. Solid Form IV of compound of formula (I) can be characterized by an XRPD pattern comprising the peaks at about 8.9°, 12.0°, 14.6°, 15.2°, 15.7°, 17.8°, 19.2°, 20.5°, 21.6°, 23.2°, 24.2°, 24.8°, 26.2° and 27.5° 2θ (±0.2 degrees 2θ), when measured with CuKα1 radiation. The compound of formula (I) can be transformed into polymorph form IV either by a process known from the prior art or a process comprising:
a. Dissolving compound of formula (I) in a solvent, for example N,N-dimethylformamide or dimethylsulfoxide;
b. Heating the mixture to a temperature between 60° C. and 90° C., preferably to a temperature between 70° C. and 80° C.;
c. Adding an antisolvent, for example ethylacetate, to the mixture;
d. Cooling and optionally seeding the mixture;
e. Isolating and drying of the obtained solid Form IV of compound of formula (I).

The concentration of compound of formula (I) in step a. can be between 0.02 and 0.15 g/ml, preferably it is between 0.03 and 0.09 g/ml. The solvent used in step a. is preferably N,N-dimethylformamide. The mixture is heated to a temperature between 60° C. and 90° C., preferably to a temperature between 70° C. and 80° C., step b., and stirred at the elevated temperature for between 10 and 60 minutes. Then an antisolvent, for example ethylacetate, is added, step c., at the elevated temperature. The volume ratio antisolvent: solvent can be between 1:1.5 and 1:8, preferably it is between 1:2 and 1:5. The antisolvent is added in course of between 20 and 120 minutes, preferably in the course of between 30 and 60 minutes. Then the mixture is cooled to a temperature between −20° C. and 10° C., preferably to a temperature between −5° C. and 5° C. and stirred at this temperature for between 60 and 240 minutes, preferably for between 120 and 180 minutes to isolate the compound of formula (I). The mixture can be seeded by compound of formula (I) in the solid Form IV, preferably when the temperature of the mixture during cooling reaches 58-60° C. The compound of formula (I) can be isolated by any suitable technique, for example using filtration. The isolated solid is dried to provide the compound of formula (I) in the solid Form IV.

In comparison with the processes disclosed in the prior art the presented process has following advantages:
1. The amount of the catalyst used in the reaction step between compound of formula (III) and 2-vinylpyridine is decreased, the reaction time of the reaction is shorter;
2. The amount of residual Pd in compound of formula (I) is low, under 10 ppm, preferably under 5 ppm, more preferably under 1 ppm;
3. Solid compounds of formula (II) or (IIa) or (VIII) provide a possibility for further improving chemical purity of compound of formula (I).

The invention will be further illustrated by the following, non-limiting, examples.

EXAMPLES

XRPD spectrums were obtained using the following measurement conditions:

Panalytical Empyrean diffractometer with Θ/2Θ geometry (transmition mode), equipped with a PixCell 3D detector;

| | |
|---|---|
| Start angle (2θ): | 2.0° |
| End angle (2θ): | 35.0° |
| Step size: | 0.026° |
| Scan speed: | 0.0955°/seconds |
| Radiation type: | Cu |
| Radiation wavelengths: | 1.5406 Å (Kα1), primary monochromator used |
| Divergence slit: | ½° |
| Antiscatter slit: | ½° |
| Soller slit: | 0.02 rad |
| Detector slit: | 7.5 mm |
| Rotation speed: | 30 rpm |

Example 1: Preparation of 2-((3-iodo-1H-indazol-6-yl)thio)-N-methylbenzamide

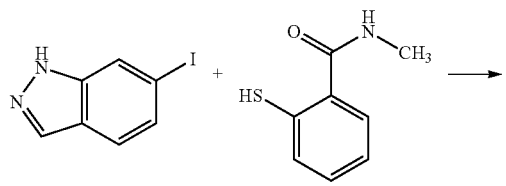

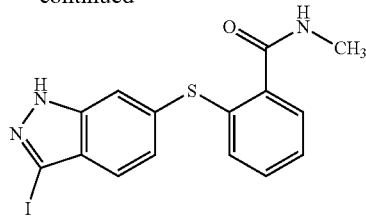

Under nitrogen atmosphere 3 kg of 1-methyl-2-pyrrolidone is mixed with 4.4 kg of 6-iodo-TH-indazole, 7.3 kg of potassium carbonate and 0.17 kg of Copper (II) acetate hydrate at 20-25° C. The mixture is heated to 80° C.

3.5 kg of 2-mercapto-N-methylbenzamide is mixed with 1.75 kg of 1-methyl-2-pyrrolidone and the mixture is heated to 60° C. The solution is added to the previously prepared solution of 6-iodo-1H-indazole at 80° C. in the course of 15 minutes. The mixture is then stirred at 105° C. for 90 minutes.

Then a solution of 8.2 kg of iodine in 2.8 kg of 1-methyl-2-pyrrolidone is added. The mixture is stirred at 105° C. for 120 minutes. Then it is cooled to 80° C. 10.7 kg of acetonitrile is added. A mixture of 5 kg of ascorbic acid in 24 kg of water is added in the course of 120 minutes at 80° C. Then 24 kg of water is added in the course of 80 minutes at 80° C. The resulting mixture is cooled to 0-5° C. in the course of 4 hours. The mixture is filtered off. Under nitrogen atmosphere the obtained solid is mixed with 20 kg of acetone and 10 kg of water, the mixture is heated to 55-60° C. and stirred at this temperature for 1 hour. Then the mixture is cooled to 20° C., filtered and the filtered solid is washed with 3 kg of chilled acetone and dried to provide 2-((3-iodo-1H-indazol-6-yl)thio)-N-methylbenzamide in 65% yield and 99% purity (HPLC ES).

Example 2: Purification of 2-((3-iodo-1H-indazol-6-yl)thio)-N-methylbenzamide in 1-methyl-2-pyrrolidone 5 kg of 2-((3-iodo-1H-indazol-6-yl)thio)-N-methylbenzamide (purity 94%, HPLC ES) was dissolved in 6.8 kg of 1-methyl-2-pyrrolidone at 105° C. The mixture was stirred at this temperature for 60 minutes. Then the mixture was cooled to 0° C. in the course of 210 minutes. The precipitated solid was filtered off to provide 2-((3-iodo-1H-indazol-6-yl)thio)-N-methylbenzamide in 97% yield and 99.3% purity (HPLC ES).

Example 3: Preparation of Axitinib, Compound of Formula (I)

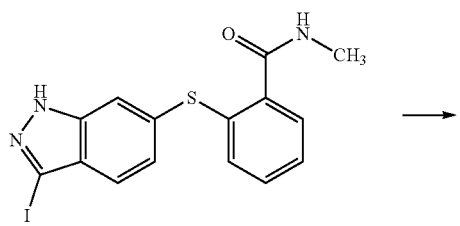

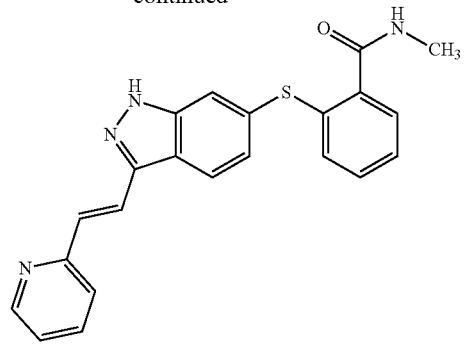

In the first reaction vessel under atmosphere of nitrogen 0.024 kg of palladium(II) acetate, 0.062 kg of Xantphos were mixed with 0.85 kg of anhydrous 1-methyl-2-pyrrolidone. 0.048 kg of N,N-dicyclohexylmethylamine was added and the mixture was heated to 90° C.

In the second reaction vessel under atmosphere of nitrogen 2.2 kg of 2-((3-iodo-1H-indazol-6-yl)thio)-N-methylbenzamide were mixed with 6.6 kg of 1-methyl-2-pyrrolidone, 2.17 kg of N,N-dicyclohexylmethylamine and 1.1 kg of acetic anhydride. The mixture was heated to 120° C. and 3.4 kg of 2-vinylpyridine was added. The mixture of the first reaction vessel was added to the second reaction vessel. The mixture was stirred at 110°–125° C. for 3.5 hours. The mixture is then cooled to 65° C. and 5.2 kg of tetrahydrofurane and 0.1 kg of celite are added. The mixture is stirred at 50° C. for 30 minutes and filtered. The filter cake was washed with 3.2 kg of of tetrahydrofurane. The filtrate was cooled to 20-25° C. and 0.8 kg of 1,2-diaminopropane was added. The mixture was stirred at 20-25° C. for 1 hour. Then the mixture was heated to 50-55° C. and 44 kg of water was added in the course of 120 minutes.

The resulting suspension was stirred at 50-55° C. for 30 minutes, then it was cooled to 0-5° C. and stirred at this temperature for 30 minutes. The precipitated solid was filtrated off and the filter cake was washed with 4.4 kg of tetrahydrofurane to provide 2 kg of Axitinib (96% of theoretical yield and 97.7% purity (HPLC IN).

Example 4: Purification of Axitinib

Axitinib prepared according to example 3 was mixed with 2.9 kg of 1-methyl-2-pyrrolidone and 1.55 kg of tetrahydrofurane. The mixture was heated to 75-80° C. and 2.45 kg of 10% solution of HCl in N,N-dimethylformamide was added. The mixture was stirred for 15 minutes. The mixture was then cooled to 65° C. 13.8 kg of methanol was added at this temperature in the course of 120 minutes and the mixture was stirred at 65° C. for 15 minutes. The mixture was cooled to 0-5° C. and stirred at this temperature for 30 minutes. The mixture was filtered off and the filtrated mass was washed with 1.6 kg of ethylacetate and dried to obtain 1.7 kg of Axitinib.HCl salt (compound (VIII) in 99.5% purity (HPLC IN). The XRPD of the obtained solid corresponds to XRPD pattern depicted in FIG. 1. Obtained Axitinib.HCl was mixed with 4.1 kg of 1-methyl-2-pyrrolidone and 1.32 kg of tetrahydrofurane and 0.93 kg of 1,2-diaminopropane. The mixture was heated to 60-65° C. To the mixture 80 g of charcoal in 0.4 kg of tetrahydrofurane was added and then the mixture was stirred for 30 minutes. The mixture was filtered and the filter cake was washed with 1 kg of tetrahydrofurane. To the mixture 8.4 kg of methanol was added at 60-65° C. in the course 2.5 hours. The mixture was cooled to −5-0° C. and stirred at this temperature for 30 minutes. The mixture was filtered off and the filter cake was washed with 1.65 kg of methanol and dried to provide 1.5 kg of Axitinib in purity 99.99% purity (HPLC ES). The content of residual Pd in obtained Axitinib was less than 0.5 ppm.

Example 5: Preparation of Axitinib in Solid Form IV

Under nitrogen atmosphere 0.55 kg of Axitinib was mixed with 4.5 kg of N,N-dimethylformamide. The mixture was heated to 80-85° C. and filtered to obtain the first filtrate. The filter cake was washed with 0.7 kg of N,N-dimethylformamide and the filtrate was mixed with the first filtrate. To the mixed filtrates at 85-90° C. 5.4 kg of ethylacetate in the course of 30 minutes was added and the mixture was cooled to 0° C. and stirred at this temperature for 180 minutes. The mixture was filtered off and the cake was washed with 2 kg of ethylacetate. The filtrated solid was blew on filter for 5 hours and then dried at 130° C. for 5 hours to obtain Axitinib Form IV in 86% yield and 99.99% purity (HPLC ES).

The invention claimed is:

1. A process for the preparation of a compound of formula (I) or a salt thereof:

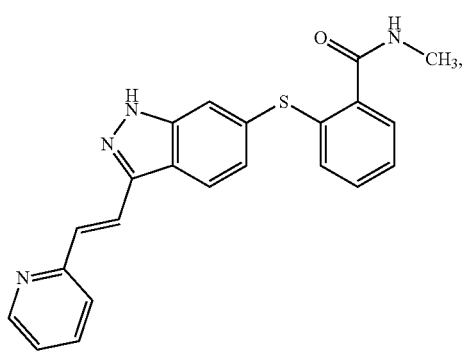

(I)

comprising:
a) preparing a palladium catalyst wherein the palladium catalyst is a mixture comprising a palladium source, a ligand, and a base in a suitable solvent;
b) mixing a compound of formula (III):

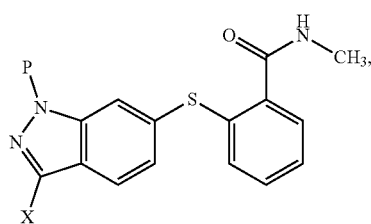

(III)

with 2-vinylpyridine and a solvent, wherein X is I, Cl, Br, or trifluoromethanesulfonate and P is a protective group;

c) adding the palladium catalyst prepared in step a) to the mixture prepared in step b) to provide a compound of formula (IV);

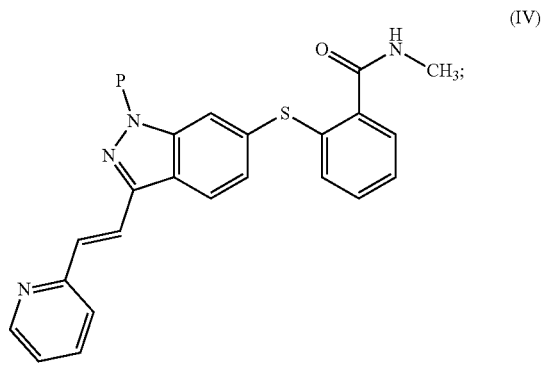

(IV)

and d) deprotecting the compound of formula (IV) to provide the compound of formula (I) or a salt thereof;

wherein the palladium source is used in a range from 1 to 2 molar % based on the compound of formula (III).

2. The process according to claim 1, wherein the palladium source is selected from palladium acetate, tetrakis(triphenylphosphine) palladium, or palladium chloride.

3. The process according to claim 2, wherein the palladium source is palladium acetate.

4. The process according to claim 1, wherein the ligand is selected from triphenylphosphine, phosphinooxazolines, or 4,5-Bis (diphenylphosphino)-9,9-dimethylxanthene.

5. The process according to claim 1, wherein the X is I.

6. The process according to claim 1, wherein the protective group is selected from an acyl, acetyl, formyl, sulfonyl, or carbamate.

7. The process according to claim 6, wherein the protective group is acetyl.

8. The process according to claim 1, wherein the compound of formula (I) or a salt thereof comprises less than 10 ppm of Pd.

9. The process according to claim 8, wherein the compound of formula (I) or a salt thereof comprises less than 5 ppm of Pd.

10. The process according to claim 9, wherein the compound of formula (I) or a salt thereof comprises less than 1 ppm of Pd.

* * * * *